United States Patent
Giles et al.

(10) Patent No.: US 11,708,929 B2
(45) Date of Patent: Jul. 25, 2023

(54) GRIPPER ASSEMBLY FOR PIPELINE ISOLATION TOOL AND METHODS OF USE

(71) Applicant: Safe Isolations LLC, Houston, TX (US)

(72) Inventors: Paul Giles, Houston, TX (US); Humon Glenn Fardsalehi, Baton Rouge, LA (US)

(73) Assignee: SAFE ISOLATIONS LLC, Houston, TX (US)

( * ) Notice: Subject to any disclaimer, the term of this patent is extended or adjusted under 35 U.S.C. 154(b) by 18 days.

(21) Appl. No.: 17/467,186

(22) Filed: Sep. 4, 2021

(65) Prior Publication Data

US 2022/0074536 A1  Mar. 10, 2022

Related U.S. Application Data

(60) Provisional application No. 63/074,826, filed on Sep. 4, 2020.

(51) Int. Cl.
*F16L 55/136* (2006.01)
*F16L 55/128* (2006.01)

(52) U.S. Cl.
CPC ......... *F16L 55/136* (2013.01); *F16L 55/1283* (2013.01)

(58) Field of Classification Search
CPC ............................ F16L 55/136; F16L 55/1283
USPC .......................................................... 138/89
See application file for complete search history.

(56) References Cited

U.S. PATENT DOCUMENTS

| | | | |
|---|---|---|---|
| 3,561,490 A | 2/1971 | Little | |
| 3,746,026 A | 7/1973 | Herring | |
| 4,332,277 A * | 6/1982 | Adkins | F16L 55/1283 405/170 |
| 4,465,104 A * | 8/1984 | Wittman | F16L 55/1283 405/170 |
| 5,293,905 A * | 3/1994 | Friedrich | F16L 55/1283 166/135 |
| 6,129,118 A * | 10/2000 | Friedrich | F16L 55/1283 166/135 |
| 7,314,065 B1 * | 1/2008 | Adelman | F16L 55/11 138/90 |
| 7,841,364 B2 | 11/2010 | Yeazel et al. | |
| 7,866,347 B2 | 1/2011 | Bowie | |
| 8,267,124 B2 | 9/2012 | Bowie | |
| 8,307,856 B2 | 11/2012 | Yeazel et al. | |
| 8,935,951 B2 | 1/2015 | Bowie | |
| 9,027,602 B2 | 5/2015 | Bowie | |
| 9,057,447 B2 | 6/2015 | Bowie | |
| 9,169,956 B2 | 10/2015 | Bowie | |
| 9,400,076 B2 * | 7/2016 | Early | F16L 55/128 |
| 10,001,220 B2 | 6/2018 | Bowie | |
| 10,436,372 B2 | 10/2019 | Bjorsvik et al. | |

(Continued)

*Primary Examiner* — Craig M Schneider
*Assistant Examiner* — David R Deal
(74) *Attorney, Agent, or Firm* — Ewing & Jones, PLLC

(57) ABSTRACT

A gripper assembly for a pipeline plug includes an actuator plate, bowl, and gripper unit. The actuator plate includes a wedge surface. The bowl includes a bowl expansion face. The bowl expansion face has bowl stairsteps. The gripper unit includes a gripper body. The gripper body is positioned between the actuator plate and the bowl. The gripper body includes an expansion face having gripper stairsteps, the gripper stairsteps corresponding to the bowl stairsteps.

12 Claims, 9 Drawing Sheets

(56) References Cited

U.S. PATENT DOCUMENTS

| | | | |
|---|---|---|---|
| 2002/0101040 A1* | 8/2002 | Russell | F16L 55/136 285/305 |
| 2007/0023096 A1* | 2/2007 | Buckley | F16L 55/132 73/49.8 |
| 2010/0133864 A1* | 6/2010 | Syse | F16L 55/1283 294/92 |
| 2012/0055667 A1 | 3/2012 | Ingram et al. | |

* cited by examiner

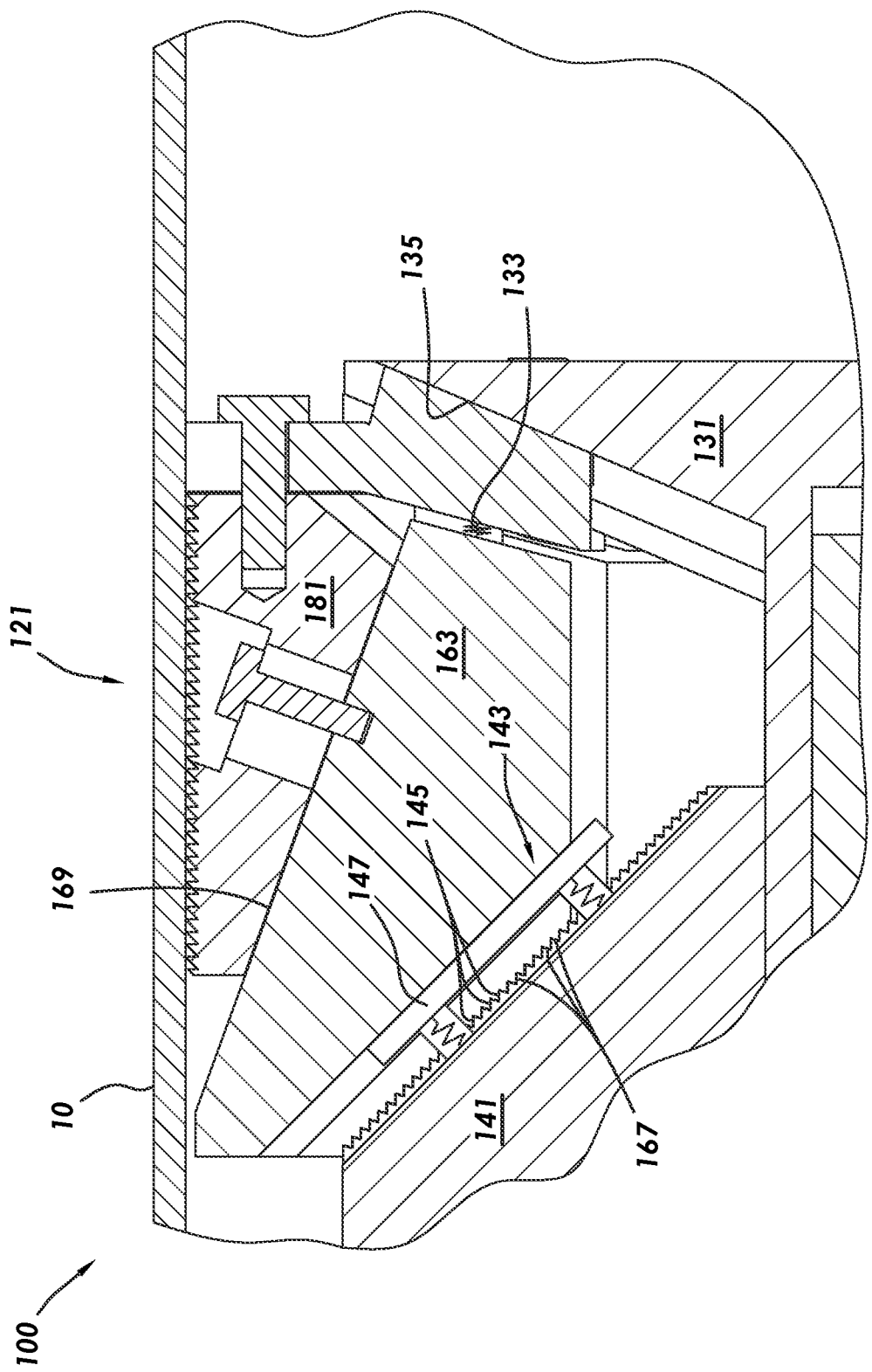

GRIPPER ASSEMBLY FOR PIPELINE ISOLATION TOOL AND METHODS OF USE

CROSS-REFERENCE TO RELATED APPLICATIONS

This application is a nonprovisional application which claims priority from U.S. provisional application No. 63/074,826, filed Sep. 4, 2020, which is incorporated by reference herein in its entirety.

TECHNICAL FIELD/FIELD OF THE DISCLOSURE

The present disclosure relates generally to pipeline tools and specifically to pipeline isolation tools.

BACKGROUND OF THE DISCLOSURE

Pipelines are used to transport liquids and gases over long distances. In some circumstances, a section of the pipeline needs to be isolated from pressure and fluids within the rest of the pipeline. For example, such isolation may be needed while undertaking planned maintenance or emergency repair of the pipeline or equipment associated with the pipeline such as valves. Additionally, such isolation may be needed while pressure testing certain sections of the pipeline.

When isolation of the pipeline is needed, one or more pipeline plugs may be introduced into the pipeline and moved to the desired isolation position. The pipeline plug may be introduced inline and moved through the pipeline to a desired position or may be introduced intrusively through an opened section of the pipeline. Once in position, the pipeline plug may be actuated such that the plug holds itself in place and fluidly isolates the section of the pipeline on one side of the pipeline plug from the section of the pipeline on the other side of the pipeline plug.

SUMMARY

The present disclosure provides for a gripper assembly for a pipeline plug. The gripper assembly may include an actuator plate, the actuator plate including a wedge surface. The gripper assembly may include a bowl. The bowl may include a bowl expansion face. The bowl expansion face may have bowl stairsteps. The gripper assembly may include a gripper unit including a gripper body. The gripper body may be positioned between the actuator plate and the bowl. The gripper body may include an expansion face having gripper stairsteps, the gripper stairsteps corresponding to the bowl stairsteps.

The present disclosure provides for a gripper assembly for a pipeline plug. The gripper assembly may include an actuator plate. The actuator plate may include a wedge surface. The gripper assembly may include a bowl, the bowl including a bowl expansion face. The gripper assembly may include a gripper unit. The gripper unit may include a gripper body and a sliding wedge. The sliding wedge may abut a radially outer surface of the gripper body. The gripper unit may be positioned between the actuator plate and the bowl. The gripper body may include an expansion face abutting the bowl expansion face. The radially outer surface of the gripper body may be formed at an angle or curved.

The present disclosure also provides for a method. The method may include positioning a pipeline plug in a pipeline, the pipeline plug including a gripper assembly. The gripper assembly may include an actuator plate, the actuator plate including a wedge surface. The gripper assembly may include a bowl. The bowl may include a bowl expansion face. The bowl expansion face may have bowl stairsteps. The gripper assembly may include a gripper unit including a gripper body. The gripper body may be positioned between the actuator plate and the bowl. The gripper body may include an expansion face having gripper stairsteps, the gripper stairsteps corresponding to the bowl stairsteps. The method may include longitudinally moving the actuator plate toward the bowl, moving the gripper unit radially outward, and engaging the gripper stairsteps to the bowl stairsteps.

The present disclosure also provides for a method. The method may include positioning a pipeline plug in a pipeline, the pipeline plug including a gripper assembly. The gripper assembly may include a bowl, the bowl including a bowl expansion face. The gripper assembly may include a gripper unit. The gripper unit may include a gripper body and a sliding wedge. The sliding wedge may abut a radially outer surface of the gripper body. The gripper unit may be positioned between the actuator plate and the bowl. The gripper body may include an expansion face abutting the bowl expansion face. The radially outer surface of the gripper body may be formed at an angle or curved. The method may include longitudinally moving the actuator plate toward the bowl, moving the gripper unit radially outward, engaging the sliding wedge to the pipeline, moving the pipeline plug relative to the pipeline, and sliding the sliding wedge relative to the gripper body.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 8 depicts a partial cross section view of the gripper assembly of FIG. 5 in a set position

DETAILED DESCRIPTION

Figure 1:
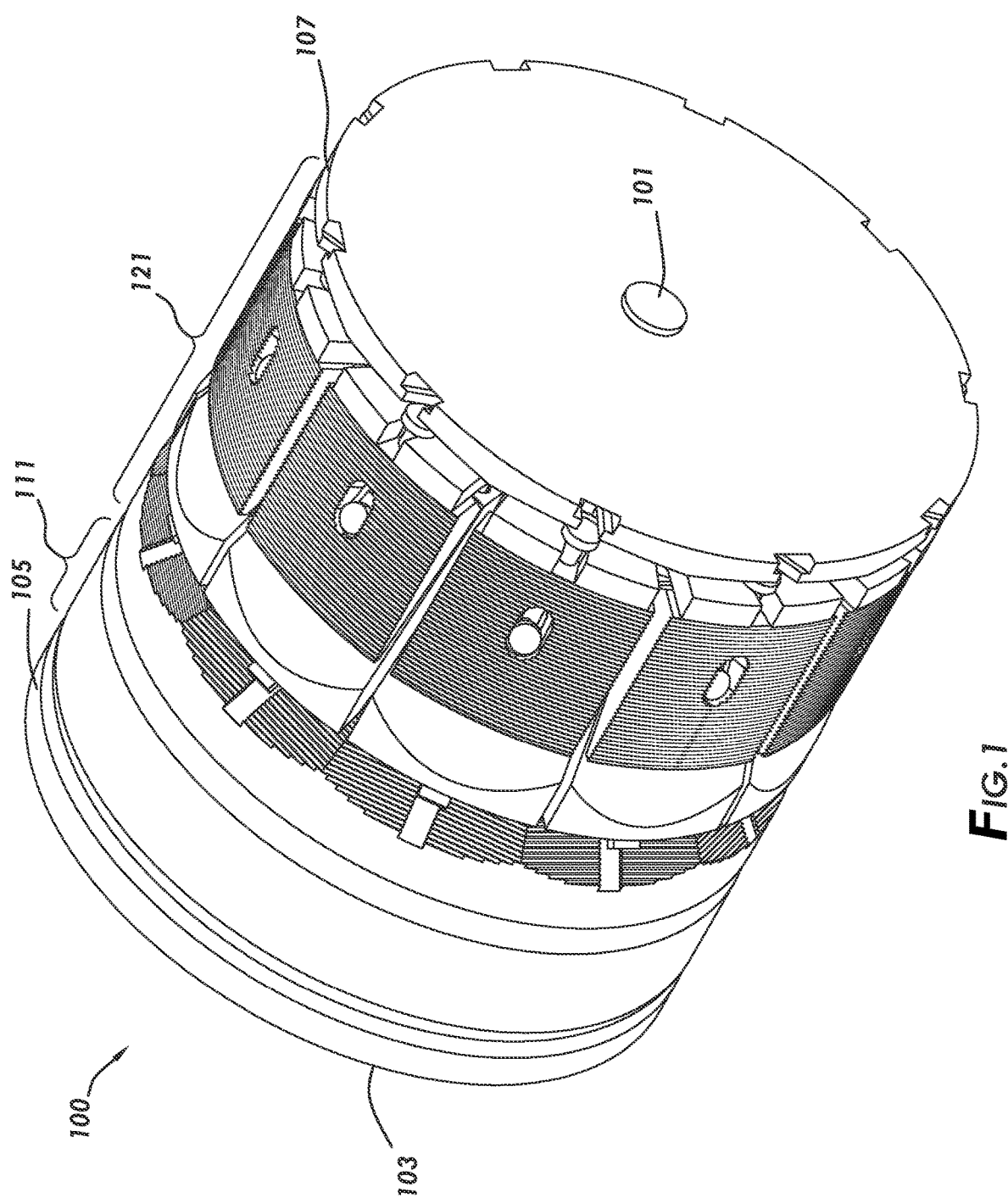
FIG. 1 depicts a perspective view of a pipeline plug consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
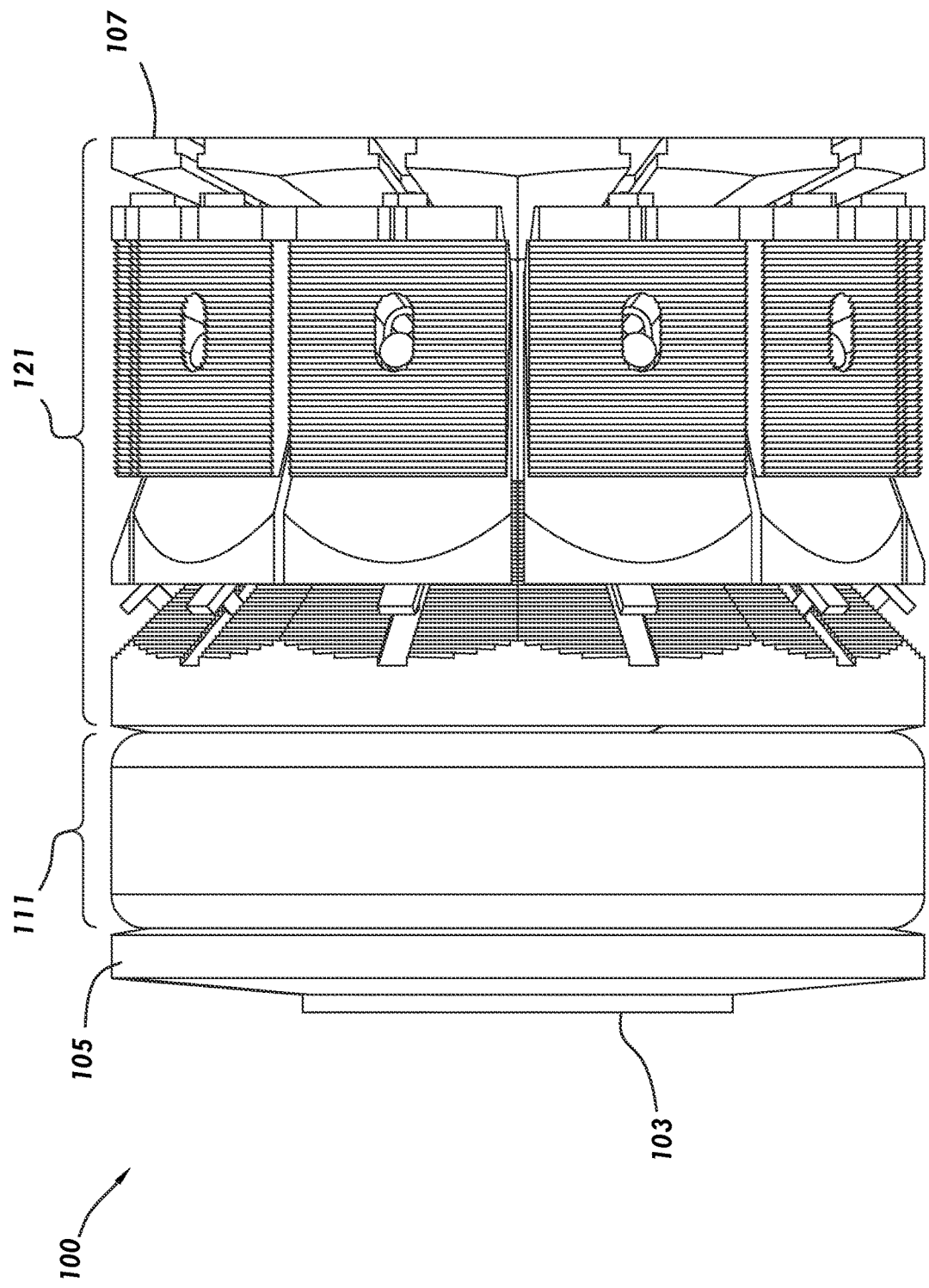
FIG. 2 depicts a side elevation view of a pipeline plug including a gripper assembly consistent with at least one embodiment of the present disclosure.

FIGS. 1 and 2 depict pipeline plug 100 consistent with at least one embodiment of the present disclosure. In some embodiments, pipeline plug 100 may include plug body 101. Plug body 101 may be generally tubular. In some embodiments, pipeline plug 100 may include actuation mechanism 103. Actuation mechanism 103 may include fixed head 105 and movable head 107. In some embodiments, fixed head 105 may be formed as part of or coupled to plug body 101. In some embodiments, movable head 107 may be movable relative to fixed head 105 by, for example and without limitation, hydraulic pressure, pneumatic pressure, or electromechanically. In some embodiments, actuation mechanism 103 may be at least partially positioned within plug body 101.

In some embodiments, pipeline plug 100 may include seal assembly 111. Seal assembly 111 may be annular or tubular in shape and may be positioned about plug body 101. When actuated, seal assembly 111 may engage the pipeline such that seal assembly 111 fluidly isolates the section of the pipeline on one side of seal assembly 111 from the section of pipeline on the other side of seal assembly 111.

In some embodiments, pipeline plug 100 may include gripper assembly 121. Gripper assembly 121 may be annular or tubular in shape and may be positioned about plug body 101. Gripper assembly 121 may be used to maintain the position of pipeline plug 100 within a pipeline. Gripper assembly 121 may include one or more gripping elements that extend radially outward into engagement with the pipeline when in an actuated position as discussed further herein below.

In some embodiments, actuation mechanism 103 may be used to actuate gripper assembly 121 and, in some embodiments, seal assembly 111. In some embodiments, movement of movable head 107 may longitudinally compress gripper assembly 121 and, in some embodiments, seal assembly 111 as further described below.

Figure 3:
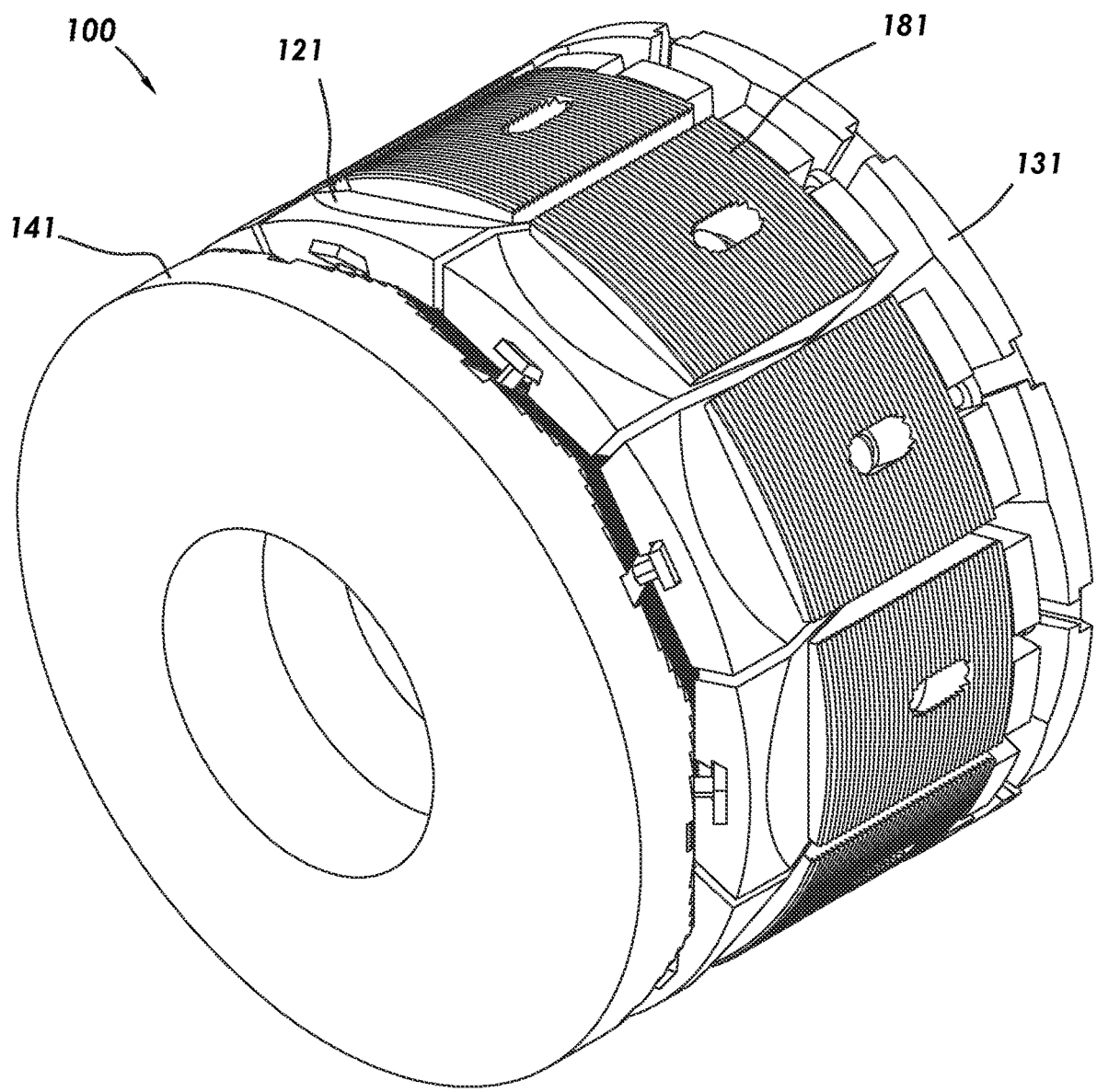
FIG. 3 depicts a perspective view of a gripper assembly consistent with at least one embodiment of the present disclosure in an unset position.

FIG. 3 depicts gripper assembly 121 consistent with at least one embodiment of the present disclosure. In some embodiments, gripper assembly 121 may include actuator plate 131 and bowl 141. Actuator plate 131 and bowl 141 may be compressed longitudinally together by actuation mechanism 103 when gripper assembly 121 is to be engaged.

Figure 4:
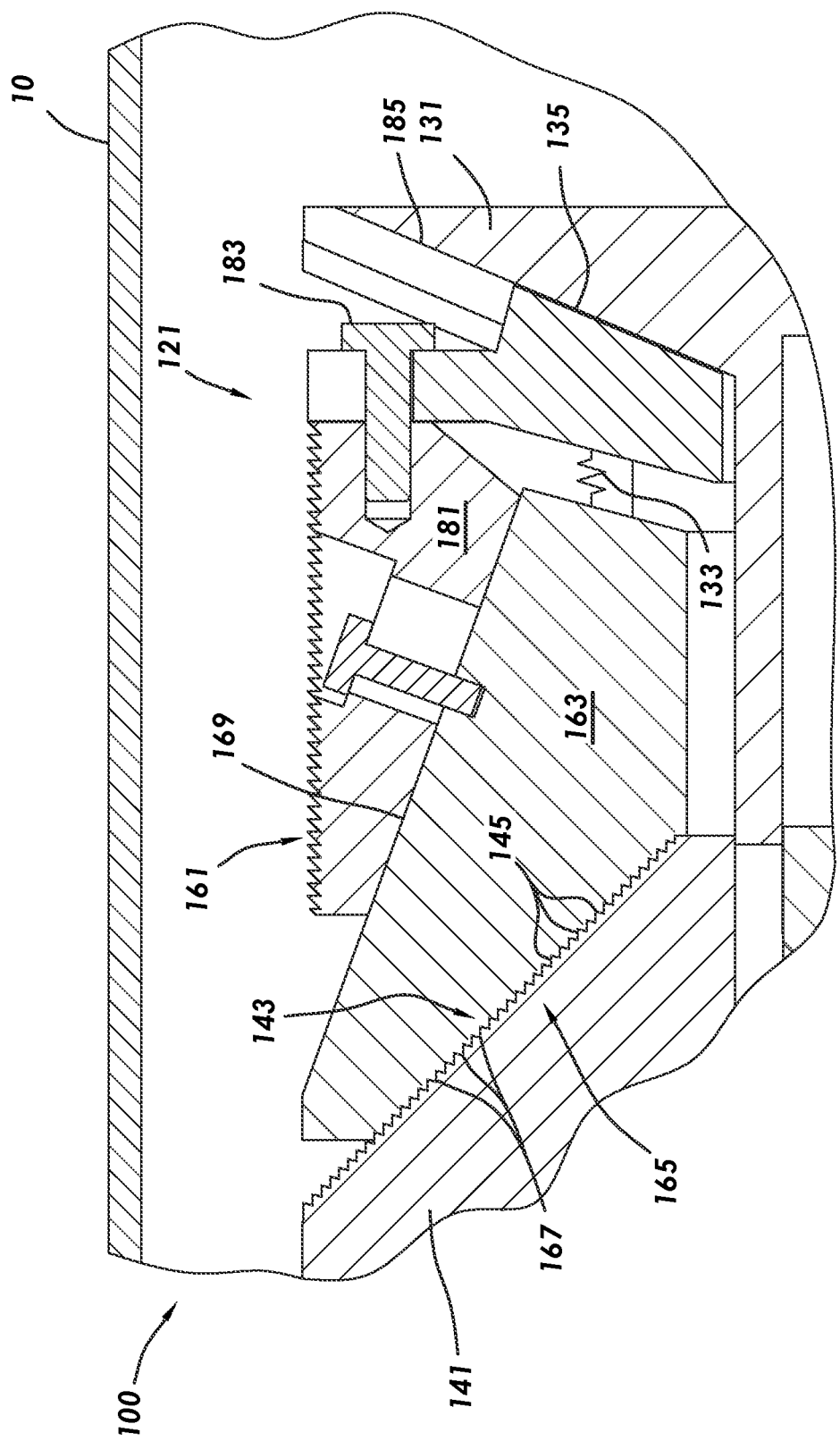
FIG. 4 depicts a partial cross section view of the gripper assembly of FIG. 3.

In some embodiments, as shown in FIG. 4, gripper assembly 121 may include gripper units 161 positioned between actuator plate 131 and bowl 141. Each gripper unit 161 may include gripper body 163 and sliding gripper 181. Gripper body 163 may be positioned between actuator plate 131 and bowl 141. In some embodiments, gripper body 163 may abut actuator plate 131. In other embodiments, actuator plate 131 may engage against gripper body 163 through actuator expansion spring 133. Actuator expansion spring 133 may be positioned between actuator plate 131 and gripper body 163 and may, in some embodiments, allow force to be applied against gripper body 163 by actuator plate 131 while allowing some relative movement between actuator plate 131 and gripper body 163.

In some embodiments, sliding gripper 181 may be mechanically coupled to actuator plate 131 by fastener 183. Fastener 183 may allow for movement of sliding gripper 181 relative to actuator plate 131. Fastener 183 may, for example and without limitation, be a threaded fastener or a dovetail connection between actuator plate 131 and sliding gripper 181.

Figure 4A:
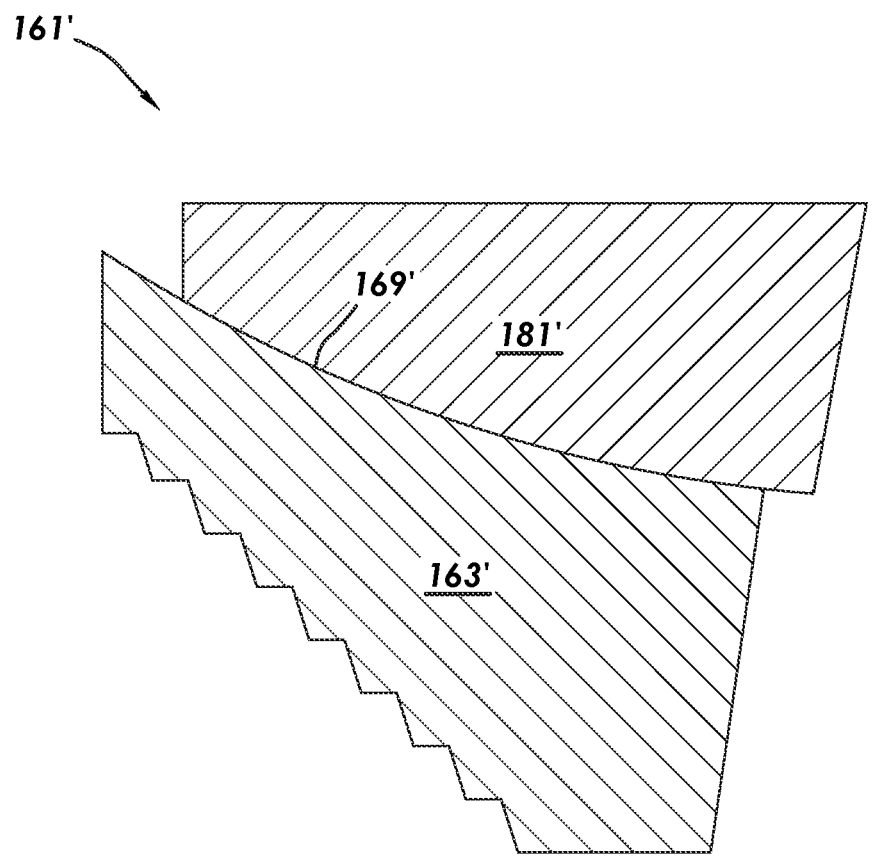
FIG. 4A depicts a simplified partial cross section view of a gripper unit consistent with at least one embodiment of the present disclosure.

In some embodiments, as shown in FIG. 4, sliding gripper 181 may abut gripper body 163 at radially outward face 169 of gripper body 163. In some embodiments, sliding gripper 181 may be wedge shaped. In some such embodiments, radially outward face 169 may be formed at an angle as shown in FIG. 4 or may be curved as shown in FIG. 4A (shown as radially outward face 169' of gripper body 163' of gripper unit 161') to correspond with the contour of sliding gripper 181 (or 181' in FIG. 4A). In such an embodiment, longitudinal movement of sliding gripper 181 relative to gripper body 163 may cause sliding gripper 181 to move radially outward from gripper body 163. Such longitudinal movement may, in some embodiments, be caused by longitudinal movement of gripper assembly 121 relative to a pipeline when in the set position as further described below.

In some embodiments, sliding gripper 181 may include actuation surface 185 positioned to abut actuator plate 131 at wedge surface 135. In some embodiments, actuation surface 185 and wedge surface 135 are formed at an angle such that engagement of sliding gripper 181 with actuator plate 131 may bias sliding gripper 181 radially outward as further discussed below.

In some embodiments, gripper body 163 may abut bowl 141. In some such embodiments, gripper body 163 may include expansion face 165 positioned to abut bowl expansion face 143. Expansion face 165 and bowl expansion face 143 may be tapered such that as actuator plate 131 and bowl 141 are moved longitudinally closer together, gripper unit 161 may be biased along radially outward face 169 of gripper body 163 and radially outward and into contact with pipeline 10 as further discussed below.

In some embodiments, expansion face 165 may include a plurality of gripper stairsteps 167 that correspond with bowl stairsteps 145. Gripper stairsteps 167 may be formed in expansion face 165 of gripper body 163 or may be formed in another body mechanically coupled to gripper body 163. Similarly, bowl stairsteps 145 may be formed in bowl expansion face 143 or may be formed in another body mechanically coupled to bowl 141. Gripper stairsteps 167 may be formed such that gripper body 163 is moved radially outward in response to the biasing of gripper body 163 against bowl 141 by movement of actuator plate 131 as gripper stairsteps 167 engage bowl stairsteps 145. Gripper stairsteps 167 may, when engaged to bowl stairsteps 145 as further discussed below, resist radially inward motion of gripper body 163. In some embodiments, actuator expansion spring 133 may allow for non-linear motion of gripper body 163 as gripper stairsteps 167 move past bowl stairsteps 145 as gripper body 163 moves radially outward.

Figure 5:
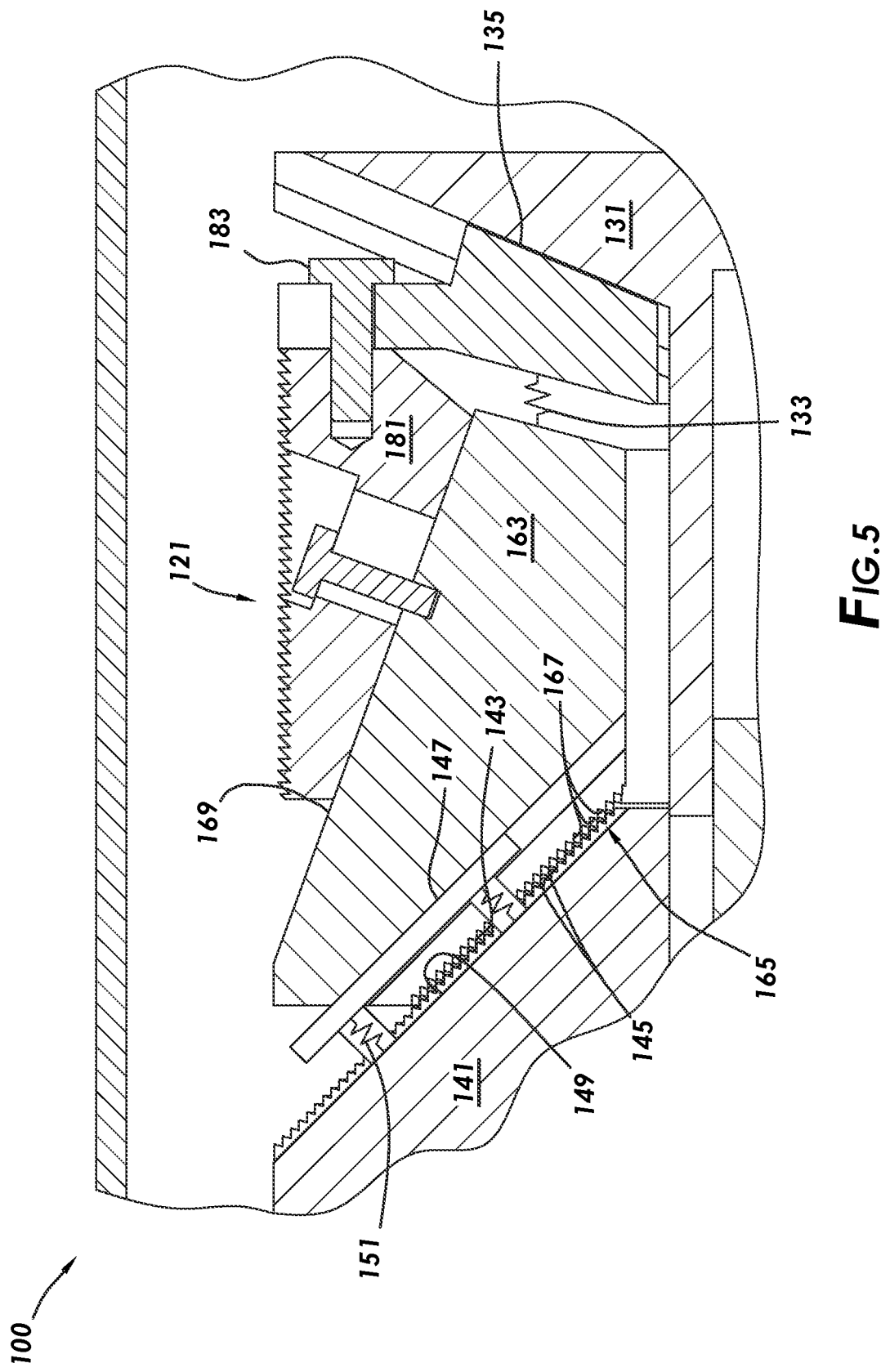
FIG. 5 depicts a partial cross section view of a gripper assembly consistent with at least one embodiment of the present disclosure.
Figure 6:
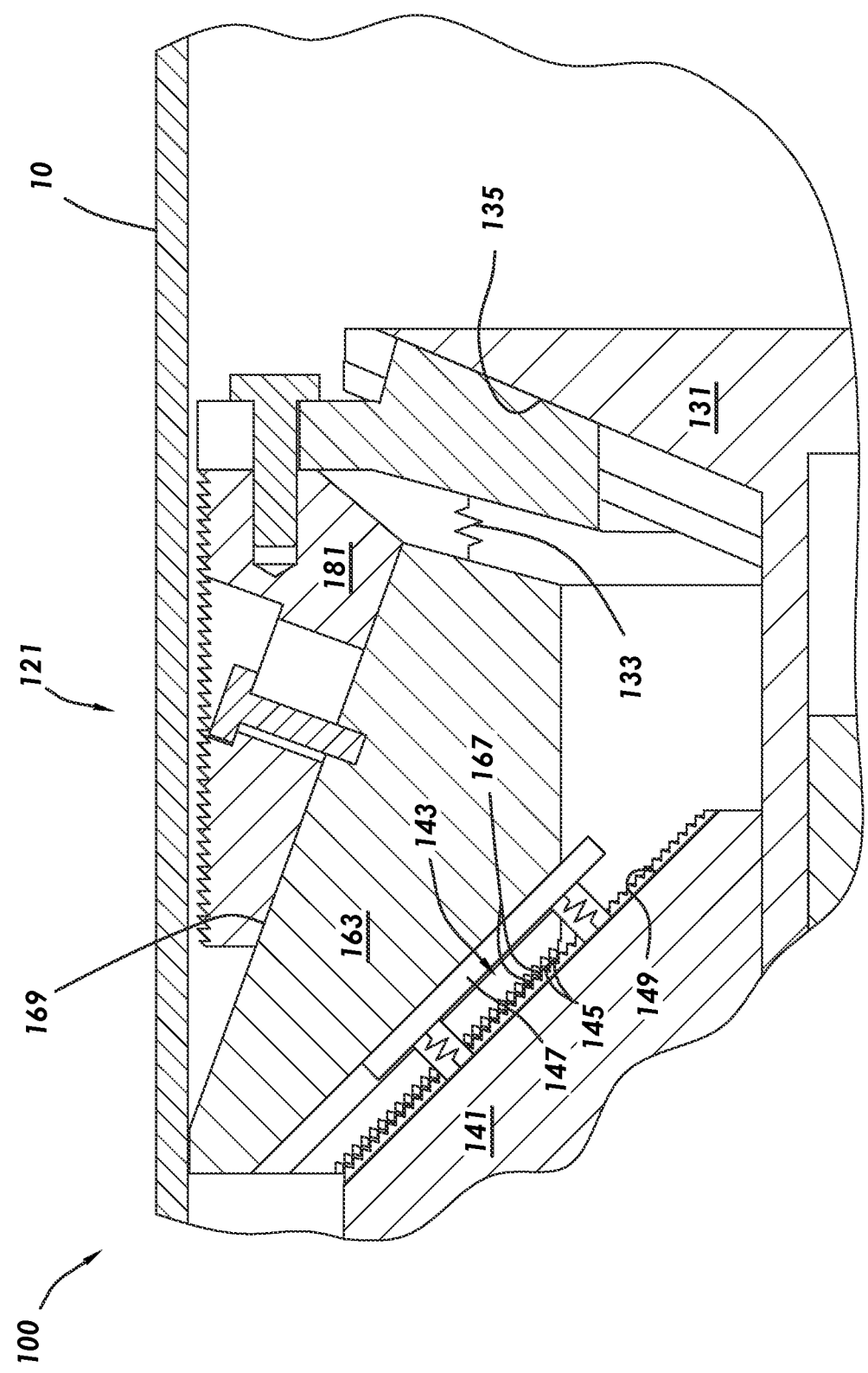
FIG. 6 depicts a partial cross section view of the gripper assembly of FIG. 5 in a partially set position.

In some embodiments, as shown in FIG. 5, bowl 141 may include spring-loaded expansion face 147. Spring-loaded expansion face 147 may be coupled to bowl 141 at bowl expansion face 143. In some embodiments, spring-loaded expansion face 147 may be positioned within slot 149 formed in bowl expansion face 143. One or more springs 151 may be positioned between slot 149 and spring-loaded expansion face 147 such that spring-loaded expansion face is biased away from and beyond bowl stairsteps 145 and into engagement with expansion face 165 of gripper body 163. In such an embodiment, spring-loaded expansion face 147 may hold gripper body 163 out of engagement with bowl stairsteps 145 until a sufficient longitudinal force is exerted between gripper body 163 and spring-loaded expansion face 147 such that spring-loaded expansion face 147 is biased into slot 149 and gripper stairsteps 167 may engage bowl stairsteps 145 as shown in FIG. 6. Such a condition may occur, for example and without limitation, once gripper unit 161 engages pipeline 10 as further described below.

Figure 7:
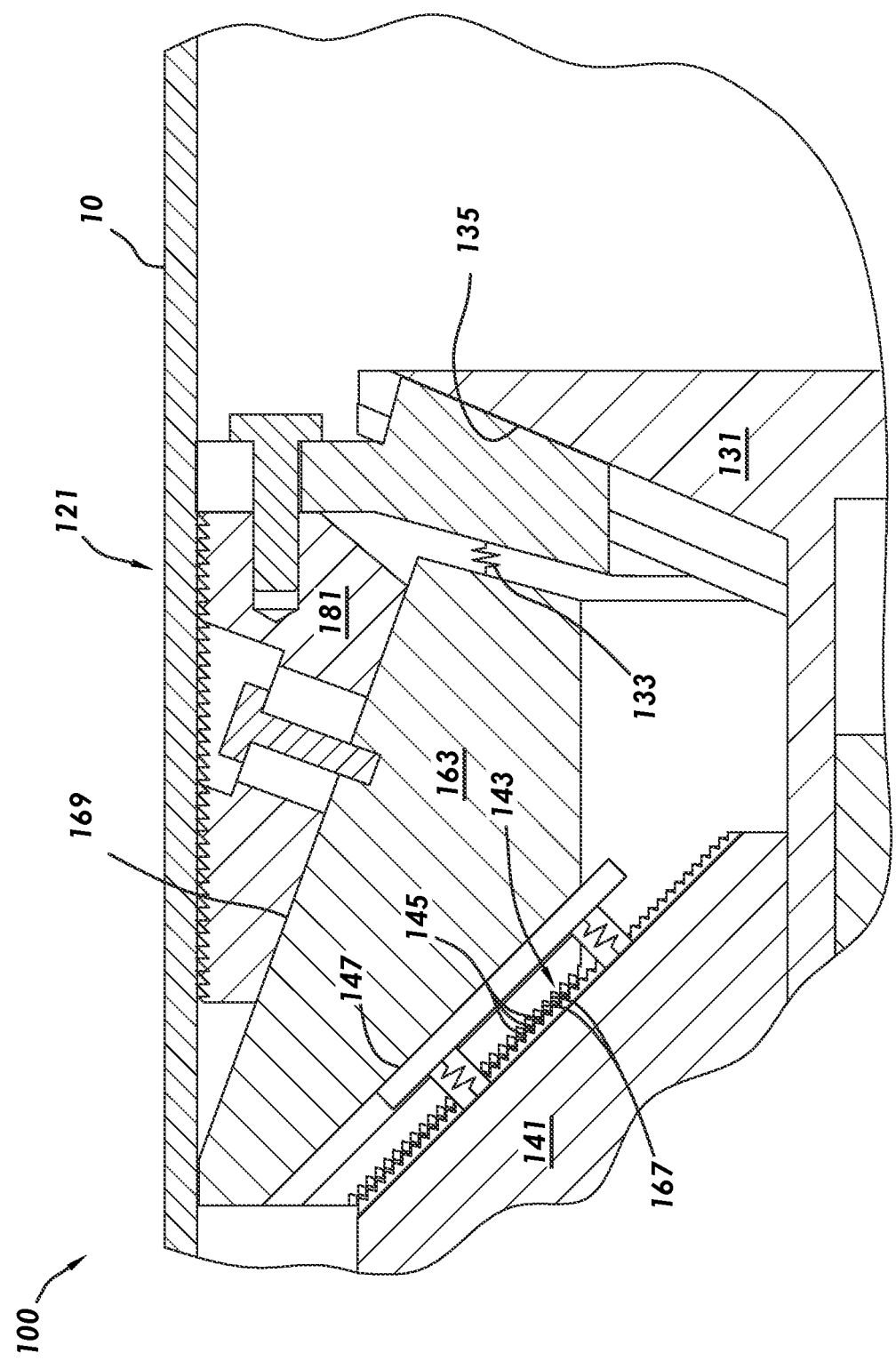
FIG. 7 depicts a partial cross section view of the gripper assembly of FIG. 5 in a partially set position.

In some embodiments, radial expansion of gripper unit 161 continues until gripper body 163 engages pipeline 10 as shown in FIG. 6. Once gripper body 163 engages pipeline 10, continued motion of actuator plate 131 may bias sliding gripper 181 further along radially outward face 169 of gripper body 163 until sliding gripper 181 engages pipeline 10 as shown in FIG. 7. In other embodiments, sliding gripper 181 may engage pipeline 10 before or simultaneously with gripper body 163.

Once sliding gripper 181 engages pipeline 10, sliding gripper 181 may be biased further into contact with pipeline 10 by further movement of actuator plate 131 and any longitudinal movement of pipeline plug 100 within pipeline 10 caused by, for example and without limitation, differential pressure across pipeline plug 100. In some embodiments, the outward force exerted on pipeline 10 by sliding gripper 181 may be exerted on gripper body 163 such that gripper stairsteps 167 fully engage bowl stairsteps 145 as shown in FIG. 8, thereby transferring the radial forces to bowl 141. Due to the configuration of gripper stairsteps 167 and bowl stairsteps 145, the ability of gripper body 163 to move radially inward is impeded.

When release of pipeline 10 is desired, actuator plate 131 and bowl 141 may be moved longitudinally apart. Fastener 183 may pull sliding gripper 181 along radially outward face 169 of gripper body 163, thereby reducing the gripping force between sliding gripper 181 and pipeline 10. As the longitudinal force exerted on gripper body 163 reduces, gripper stairsteps 167 may move out of engagement with bowl stairsteps 145. Once disengaged, gripper body 163 may move radially inward such as along spring-loaded expansion face 147, allowing gripper unit 161 to move into the retracted position.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A gripper assembly for a pipeline plug comprising:
   an actuator plate, the actuator plate including a wedge surface;
   a bowl, the bowl including a bowl expansion face, the bowl expansion face having bowl stairsteps;
   a gripper unit, the gripper unit including a gripper body, the gripper body positioned between the actuator plate and the bowl, the gripper body including an expansion face, the expansion face having gripper stairsteps, the gripper stairsteps corresponding to the bowl stairsteps; and
   an actuator expansion spring positioned between the actuator plate and the gripper body.

2. The gripper assembly of claim 1, wherein the gripper unit further comprises a sliding wedge, the sliding wedge abutting a radially outer surface of the gripper body.

3. The gripper assembly of claim 2, wherein the sliding wedge abuts the wedge surface of the actuator plate.

4. The gripper assembly of claim 2, wherein the sliding wedge is slidingly coupled to the actuator by a fastener.

5. A gripper assembly for a pipeline plug comprising:
   an actuator plate, the actuator plate including a wedge surface;
   a bowl, the bowl including a bowl expansion face, the bowl expansion face having bowl stairsteps; and
   a gripper unit, the gripper unit including a gripper body, the gripper body positioned between the actuator plate and the bowl, the gripper body including an expansion face, the expansion face having gripper stairsteps, the gripper stairsteps corresponding to the bowl stairsteps; and
   a spring-loaded expansion face, the spring-loaded expansion face positioned in a slot formed in the bowl, the spring-loaded expansion face being biased outward beyond the bowl stairsteps.

6. A gripper assembly for a pipeline plug comprising:
   an actuator plate, the actuator plate including a wedge surface;
   a bowl, the bowl including a bowl expansion face; and
   a gripper unit, the gripper unit including a gripper body and a sliding wedge, the sliding wedge abutting a radially outer surface of the gripper body the gripper unit positioned between the actuator plate and the bowl, the gripper body including an expansion face abutting the bowl expansion face, the radially outer surface of the gripper body formed at an angle or curved; and
   an actuator expansion spring positioned between the actuator plate and the gripper body.

7. The gripper assembly of claim 6, wherein the bowl expansion face further comprises bowl stairsteps, wherein the expansion face of the gripper unit further comprises gripper stairsteps corresponding to the bowl stairsteps.

8. The gripper assembly of claim 6, wherein the sliding wedge abuts the wedge surface of the actuator plate.

9. The gripper assembly of claim 6, wherein the sliding wedge is slidingly coupled to the actuator plate by a fastener.

10. A gripper assembly for a pipeline plug comprising:
    an actuator plate, the actuator plate including a wedge surface;
    a bowl, the bowl including a bowl expansion face, the bowl expansion face including bowl stairsteps;
    a gripper unit, the gripper unit including a gripper body and a sliding wedge, the sliding wedge abutting a radially outer surface of the gripper body the gripper unit positioned between the actuator plate and the bowl, the gripper body including an expansion face abutting the bowl expansion face, the expansion face of the gripper unit including gripper stairsteps corresponding to the bowl stairsteps, the radially outer surface of the gripper body formed at an angle or curved; and
    a spring-loaded expansion face, the spring-loaded expansion face positioned in a slot formed in the bowl, the spring-loaded expansion face being biased outward beyond the bowl stairsteps.

11. A method comprising:
positioning a pipeline plug in a pipeline, the pipeline plug including a gripper assembly, the gripper assembly including:
- an actuator plate, the actuator plate including a wedge surface;
- a bowl, the bowl including a bowl expansion face, the bowl expansion face having bowl stairsteps;
- a gripper unit, the gripper unit including a gripper body, the gripper body positioned between the actuator plate and the bowl, the gripper body including an expansion face, the expansion face having gripper stairsteps, the gripper stairsteps corresponding to the bowl stairsteps; and
- an actuator expansion spring positioned between the actuator plate and the gripper body;

longitudinally moving the actuator plate toward the bowl;
moving the gripper unit radially outward; and
engaging the gripper stairsteps to the bowl stairsteps.

12. A method comprising:
positioning a pipeline plug in a pipeline, the pipeline plug including a gripper assembly, the gripper assembly including:
- an actuator plate, the actuator plate including a wedge surface;
- a bowl, the bowl including a bowl expansion face, the bowl expansion face having bowl stairsteps formed therein;
- a gripper unit, the gripper unit including a gripper body and a sliding wedge, the sliding wedge abutting a radially outer surface of the gripper body the gripper unit positioned between the actuator plate and the bowl, the gripper body including an expansion face abutting the bowl expansion face, the radially outer surface of the gripper body formed at an angle or curved; and
- an actuator expansion spring positioned between the actuator plate and the gripper body:

longitudinally moving the actuator plate toward the bowl;
moving the gripper unit radially outward;
engaging the sliding wedge to the pipeline;
moving the pipeline plug relative to the pipeline; and
sliding the sliding wedge relative to the gripper body.

* * * * *